United States Patent [19]

Langer

[11] Patent Number: 5,775,909
[45] Date of Patent: Jul. 7, 1998

[54] TOOTH IMITATION

[75] Inventor: Arnold Langer, Berlin, Germany

[73] Assignee: Kryolan GmbH Chemische Farik, Berlin, Germany

[21] Appl. No.: 760,985

[22] Filed: Dec. 5, 1996

[30] Foreign Application Priority Data

Dec. 9, 1995 [DE] Germany .................. 195 47 554.2

[51] Int. Cl.$^6$ .................................................. A61C 5/08
[52] U.S. Cl. ........................................ 433/218; 433/202.1
[58] Field of Search ........................ 433/167, 168.1, 433/180, 183, 202.1, 218, 219; 472/133, 70

[56] References Cited

U.S. PATENT DOCUMENTS

| | | | |
|---|---|---|---|
| 4,676,500 | 6/1987 | Fricano | 472/70 |
| 5,324,198 | 6/1994 | Hazen | 433/167 X |
| 5,458,489 | 10/1995 | Tennyson | 433/219 |
| 5,547,381 | 8/1996 | Nutting | 433/219 |
| 5,569,036 | 10/1996 | Goldiner et al. | 433/219 X |

*Primary Examiner*—Nicholas D. Lucchesi
*Attorney, Agent, or Firm*—McGlew and Tuttle

[57] ABSTRACT

A tooth imitation intended for application to naturally grown teeth or a correspondingly shaped denture. To make it possible for the user to use the tooth imitation without health hazard and to provide a tooth imitation which has a simple design and is easy to use, provisions are made for making the tooth imitation out of materials which are nearly completely digestible in the gastrointestinal tract in the form of a hollow body which can be directly molded onto the naturally grown teeth or the denture.

9 Claims, 1 Drawing Sheet

TOOTH IMITATION

FIELD OF THE INVENTION

The present invention pertains to a tooth imitation intended for application to naturally grown teeth or a corresponding, solid denture, and it is used in mask-making in theaters, movie and television production, etc., for carnivals for fun or for children for mimicking differently grown teeth, e.g., vampire teeth or as a temporary denture.

BACKGROUND OF THE INVENTION

A tooth imitation of this type has been known on the market as Werewolf Fangs. These consist of a hollow, preformed tooth imitation made of plastic and a connection part made of a thermoplastic plastic (thermosetting plastic), with which the tooth imitation is attached and fastened to the natural, grown teeth. The thermoplastic plastic is included for the user of the tooth imitation as a granular product, and the user has to soften the granular product in boiling water and subsequently to shape it such that the thermoplastic plastic will form a connection part between the hollow tooth imitation made of plastic and the natural, grown teeth. The thermoplastic connection part must be pulled off from the natural, grown teeth before curing under any circumstances, because it would be bound to the naturally grown teeth during curing, and such bond would be able to be eliminated by a dentist only. After complete curing of the thermoplastic connection part, the tooth imitation can be removed and put back on several times.

The prior-art tooth imitation involves the risk that the user, especially a child, may accidentally swallow it, so that there is a health hazard in the user's gastrointestinal tract because of the thermoplastic plastic used. In addition, the application of the prior-art tooth imitation to the teeth of the user is very cumbersome and complicated because of the connection part.

SUMMARY AND OBJECTS OF THE INVENTION

The primary object of the present invention is therefore to provide a tooth imitation of this type, which can be used by the user without health hazard, has a simple design and is easy to use.

To accomplish this object, the present invention provides for the tooth imitation consisting of materials which are nearly completely digestible in the user's gastrointestinal tract in the form of a hollow body, which can be directly molded onto the naturally grown teeth or a correspondingly shaped denture, and which can be easily molded onto the natural teeth or a corresponding solid denture of the user and thus it can be fixed firmly but detachably. Thus, the tooth imitation is harmless to the health of the user and thus it can also be safely used by children.

The hollow body of the tooth imitation preferably consists of a mixture of gelatin or gelatin-like material, glycerol, sorbitol, water, confectioner's sugar and dental plaster or a mixture of calcium sulfate and calcium oxide which replaces these components. This mixture for preparing the hollow body consists exclusively of materials which are nearly completely digestible in the user's gastrointestinal tract, especially only a small amount of dental plaster or similar substances are needed for curing the tooth imitation. Coloring agents in the form of titanium dioxide, iron oxide or other, insoluble food colors, as well as flavoring agents acting as flavoring matter are preferably added.

The present invention will be explained in greater detail below on the basis of an embodiment of a tooth imitation shown in the drawings for being attached to naturally grown teeth or a correspondingly shaped denture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings.

DESCRIPTION OF THE PREFERRED EMBODIMENT

The tooth imitation intended for application to naturally grown teeth or a correspondingly shaped denture is used in mask-making in the theater, movie and television production, etc., for the carnival for fun, or for children for mimicking differently grown teeth, e.g., vampire teeth, and as a temporary denture. It has a simple design and represents no health hazard to the user. To achieve this, the tooth imitation consists of materials which are nearly completely digestible in the user's gastrointestinal tract in the form of a hollow body 1, which can be directly molded onto the naturally grown teeth or a correspondingly shaped denture, and which can be easily molded onto the natural teeth of the user or a correspondingly shaped denture, and thus it can be fixed firmly but detachably.

A preferred mixture of materials for preparing the hollow body 1 as a tooth imitation comprises the following components:

| Component | Parts by weight in % | |
| --- | --- | --- |
| | Wet | Dry |
| Water | 49.20 | 1.20 |
| Methylparaben | 0.10 | 0.20 |
| Glycerol | 9.22 | 17.94 |
| Confectioner's sugar | 3.14 | 6.10 |
| Sorbitol | 6.10 | 11.87 |
| Dental plaster | 1.23 | 2.39 |
| Titanium dioxide | 0.31 | 0.60 |
| Gelatin | 30.70 | 59.70 |
| Strawberry flavor | 2 drops | — |

The mixture of the components listed above is poured in the semiliquid state into a mold, which corresponds to a negative mold of the hollow body shown in FIGS. 1 through 4, and it is subsequently dried at room temperature or under the action of heat.

Figure 1:
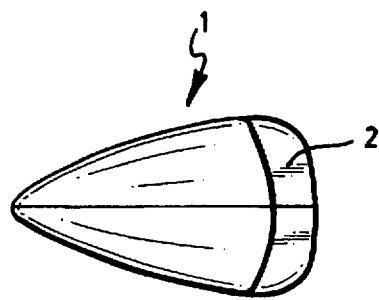
FIG. 1 is a front view of the imitation tooth according to the invention.
Figure 2:
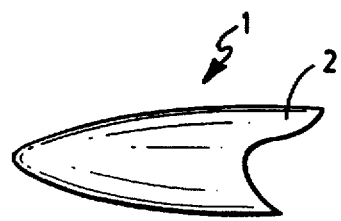
FIG. 2 is a side view thereof.
Figure 3:
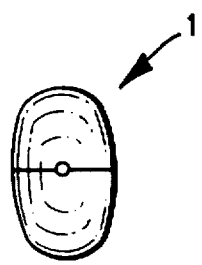
FIG. 3 is a top view thereof.
Figure 4:
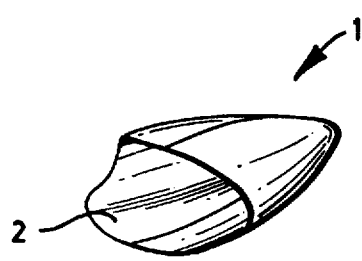
FIG. 4 is a perspective view thereof.

The hollow body 1 has the shape of an arrowhead with a stub 2 extended longer on one side, and it has an elliptical cross section (FIG. 3). The hollow body 1, which undergoes a weight loss of about 48% to 49% during drying, consists of a compact, but soft and moldable mass, which can still be readily shaped upon application to a natural tooth of the user, so that the hollow body 1 is plastically deformable at the time of introduction and can be adapted to the shape of the natural tooth. The hollow body 1 attaches itself firmly to this, it absorbs moisture from the mouth, and it attaches itself to the natural tooth like a glue. The water-soluble gelatin brings about the curing during mixing; the glycerol and sorbitol act as plasticizing agents, and the dental plaster is the curing agent and reinforcing filler. The dental plaster softens in the stomach upon accidental swallowing of the hollow body 1 and is digestible due to the its small amount. The weight of a completely dried hollow body is about 1 to 2 g.

The overall height of the one-piece hollow body including the stub 2 is about 20 mm, about 17 mm without the stub 2, and about 15 mm in the hollow between them. The large diameter of the elliptical shape is 12 mm, and the small diameter is 6 mm.

While a specific embodiment of the invention has been shown and described in detail to illustrate the application of the principles of the invention, it will be understood that the invention may be embodied otherwise without departing from such principles.

What is claimed is:

1. A tooth imitation intended for application to at least one of naturally grown teeth and a correspondingly shaped denture, the tooth imitation comprising:

materials which are nearly completely digestible in the gastrointestinal tract in the form of a hollow body which can be directly molded onto the naturally grown teeth or the denture.

2. A tooth imitation in accordance with claim 1, wherein said hollow body comprises a mixture of gelatin and glycerol, sorbitol, water, confectioner's sugar, and a dental plaster.

3. A tooth imitation in accordance with claim 2, wherein said dental plaster comprises a mixture of calcium sulfate and calcium oxide.

4. A tooth imitation in accordance with claim 2, further comprising at least one of titanium dioxide, iron oxide, and an insoluble food color for coloring, added to the mixture.

5. A tooth imitation in accordance with claim 2, further comprising a flavoring agent added to the mixture.

6. A tooth imitation in accordance with claim 1, wherein said hollow body comprises a mixture of a gelatinous material and glycerol, sorbitol, water, confectioner's sugar, and a dental plaster.

7. An imitation tooth intended for application to at least one of natural teeth and a correspondingly shaped denture, the imitation tooth comprising:

a hollow body consisting of materials which are nearly completely digestible in the gastrointestinal tract, said materials comprising a mixture consisting essentially of a gelatinous material and glycerol, sorbitol, water, confectioner's sugar, at least one of titanium dioxide, iron oxide, and an insoluble food color for coloring, a flavoring agent and a dental plaster, whereby said materials can be directly molded onto the naturally grown teeth or the denture.

8. A tooth imitation in accordance with claim 7 wherein said dental plaster comprises a mixture of calcium sulfate and calcium oxide.

9. An imitation tooth intended for application to at least one of natural teeth and a correspondingly shaped denture, the imitation tooth comprising:

a hollow body consisting essentially of materials which are nearly completely digestible in the gastrointestinal tract, said materials being provided as a mixture comprising:

| Component | Parts by weight in % | |
|---|---|---|
| | Wet | Dry |
| Water | 49.20 | 1.20 |
| Methylparaben | 0.10 | 0.20 |
| Glycerol | 9.22 | 17.94 |
| Confectioner's sugar | 3.14 | 6.10 |
| Sorbitol | 6.10 | 11.87 |
| Dental plaster | 1.23 | 2.39 |
| Titanium dioxide | 0.31 | 0.60 |
| Gelatin | 30.70 | 59.70 |
| Strawberry flavor | 2 drops | — |

* * * * *